United States Patent
Scott et al.

(10) Patent No.: US 9,451,032 B2
(45) Date of Patent: Sep. 20, 2016

(54) SYSTEM AND METHOD FOR SIMPLE SERVICE DISCOVERY IN CONTENT-CENTRIC NETWORKS

(71) Applicant: Palo Alto Research Center Incorporated, Palo Alto, CA (US)

(72) Inventors: Glenn C. Scott, Los Altos, CA (US); Marc E. Mosko, Santa Cruz, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 165 days.

(21) Appl. No.: 14/250,325

(22) Filed: Apr. 10, 2014

(65) Prior Publication Data

US 2015/0296028 A1    Oct. 15, 2015

(51) Int. Cl.
| | |
|---|---|
| G06F 15/16 | (2006.01) |
| H04L 29/08 | (2006.01) |
| H04L 29/12 | (2006.01) |
| H04L 12/24 | (2006.01) |
| H04L 12/751 | (2013.01) |

(52) U.S. Cl.
CPC ........... *H04L 67/16* (2013.01); *H04L 41/5058* (2013.01); *H04L 45/02* (2013.01); *H04L 61/1541* (2013.01); *H04L 61/6068* (2013.01)

(58) Field of Classification Search
CPC   H04L 41/5058; H04L 61/1541; H04L 67/16
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al. 'VoCCN: Voice Over Content-Centric Networks.' Dec. 1, 2009. ACM ReArch'09.

(Continued)

*Primary Examiner* — Mohamed Wasel
(74) *Attorney, Agent, or Firm* — Shun Yao; Park, Vaughan, Fleming & Dowler LLP

(57) ABSTRACT

A computer system can perform service discovery in a content-centric network (CCN) by receiving a registration interest associated with a service from a service provider, and generating a confirmation content object in response to the registration interest. The confirmation content object includes at least a name for the service and an admission token. The computer system then returns the confirmation content object to the service provider, thereby enabling the service provider to provide the service to the CCN.

21 Claims, 10 Drawing Sheets

(56) References Cited

U.S. PATENT DOCUMENTS

| | | |
|---|---|---|
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,060,616 B1 * | 11/2011 | Richardson ....... G06F 17/30893 709/226 |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0087374 A1 * | 7/2002 | Boubez ................. G06Q 30/02 705/500 |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0240422 A1 * | 10/2005 | Doyle .................... G06F 9/5027 709/206 |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |

(56) References Cited

U.S. PATENT DOCUMENTS

| | | |
|---|---|---|
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |

(56) References Cited

U.S. PATENT DOCUMENTS

| | | |
|---|---|---|
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1* | 10/2013 | Zhang ............... H04L 45/306 709/217 |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0339481 A1* | 12/2013 | Hong .................. H04L 67/16 709/217 |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1* | 6/2014 | Ravindran .......... H04L 41/5058 709/223 |
| 2014/0192717 A1* | 7/2014 | Liu ..................... H04W 60/00 370/328 |
| 2014/0195328 A1 | 7/2014 | Ferens |
| 2014/0195641 A1* | 7/2014 | Wang ................. H04L 67/327 709/217 |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2015/0207633 A1* | 7/2015 | Ravindran ........... H04L 9/3247 713/176 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (Pursuit)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn$2E.

Bari, MdFaizul, et al. 'A survey of naming and routing in information-centric networks.' Communications Magazine, IEEE 50.12 (2012): 44-53.

(56) References Cited

OTHER PUBLICATIONS

Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

(56) References Cited

OTHER PUBLICATIONS

Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

(56) References Cited

OTHER PUBLICATIONS

V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.

\* cited by examiner

SYSTEM AND METHOD FOR SIMPLE SERVICE DISCOVERY IN CONTENT-CENTRIC NETWORKS

RELATED APPLICATIONS

The subject matter of this application is related to the subject matter in the following applications:

U.S. patent application Ser. No. 14/242,744, entitled "SYSTEM AND METHOD FOR DYNAMIC NAME CONFIGURATION IN CONTENT-CENTRIC NETWORKS," by inventors Priya Mahadevan and Glenn Scott, filed 1 Apr. 2014; and U.S. patent application Ser. No. 14/242,761, entitled "SYSTEM AND METHOD FOR DEVICE REGISTRATION AND DISCOVERY IN CONTENT-CENTRIC NETWORKS," by inventor Priya Mahadevan, filed 1 Apr. 2014;

the disclosures of which herein are incorporated by reference in their entirety.

BACKGROUND

1. Field

The present disclosure relates generally to a content-centric network (CCN). More specifically, the present disclosure relates to a system and method for service registration and discovery in content-centric networks (CCNs).

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, names play an important role. More specifically, content objects and Interests are identified by their names, which is typically a hierarchically structured variable-length identifier (HSVLI). Interests and content objects flow through the network based on their names. When a computing device first joins a CCN network, it needs to know where to forward Interest messages, and it also needs to know the what name or name prefix is to be included in the Interest message that needs to be sent in order to obtain basic services in the new environment. In addition, the device needs to register itself to the CCN network.

SUMMARY

One embodiment of the present invention provides a system for service discovery in a content-centric network (CCN). During operation, the system receives a registration interest associated with a service from a service provider, and generates a confirmation content object in response to the registration interest. The confirmation content object includes at least a name for the service and an admission token. The system then returns the confirmation content object to the service provider, thereby enabling the service provider to provide the service to the CCN.

In a variation on this embodiment, the registration interest further includes a public key associated with the service provider, and the admission token is encrypted using the public key.

In a variation on this embodiment, the registration interest further includes a description of the service and operational metadata associated with the service.

In a variation on this embodiment, receiving the registration interest comprises listening for interests on one or more service-discovery namespaces. The one or more service-discovery namespaces are hierarchically structured.

In a further variation, the system further receives, from a service client, a service-discovery interest in a service-discovery namespace, and generates a service-response content object. The service-response content object includes names of one or more next-level child namespaces of the service-discovery namespace. The system then returns the service-response content object to the service client, thereby enabling the service client to send a service request to the one or more next-level child namespaces In a variation on this embodiment, the system further receives a deregistration interest from the service provider for the service. The deregistration interest includes the admission token.

In a variation on this embodiment, the system further updates a service database by adding the service using the service name.

BRIEF DESCRIPTION OF THE FIGURES

In the figures, like reference numerals refer to the same figure elements.

DETAILED DESCRIPTION

Overview

Figure 1:
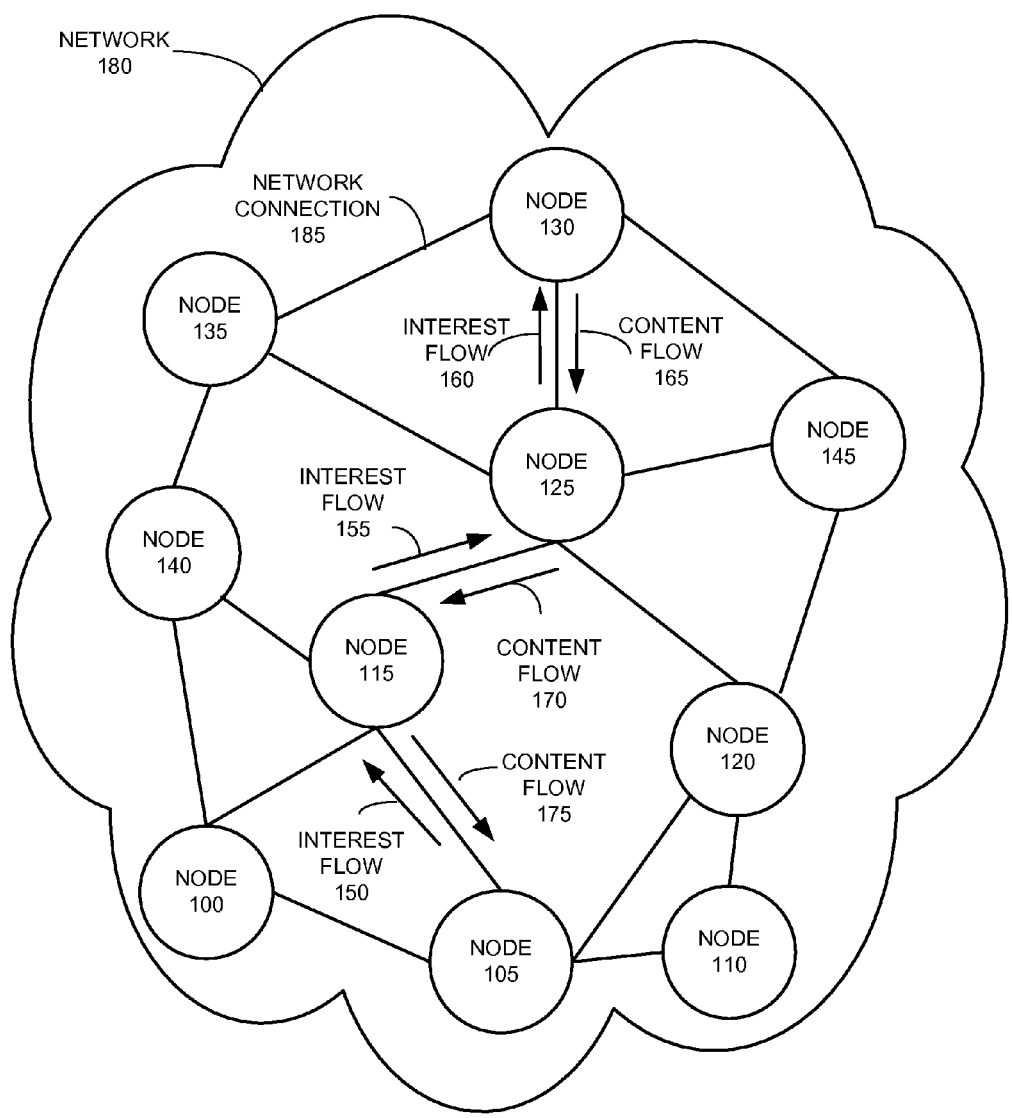
FIG. 1 illustrates an exemplary architecture of a network, in accordance with an embodiment of the present invention.

Embodiments of the present invention provide a system and method for service registration and discovery in CCNs. The solution allows network service providers to register their services with a service-discovery broker, which manages the service-discovery namespace and keeps a list of all active services. A client device trying to discover a service can send a service-discovery Interest to the service-discovery broker, which responds to such an Interest with the service name and any metadata needed for the client device to interact with the service provider.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLO may not be human readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICHALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or supernetworks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In CCN, each node maintains three major data structures, including a Forwarding Information Base (FIB), a Content Store (CS), and a Pending-Interest Table (PIT).

FIB is used to forward Interest packets toward potential source(s) of matching Content Objects. Typically, a routing protocol is used to populate the FIB among all nodes in the network. The FIB entries are often indexed by the name prefixes, with each entry including a physical address of at least one face to which the matching Interest should be forwarded. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store.

Pending Interest Table (PIT) keeps track of Interests forwarded upstream toward content source(s) so that a returned Content Object can be sent downstream to its requester(s). In CCN, only Interest packets are routed. The returning Content Object follows the trail of the Interest packet back to the content requester. A PIT entry for an Interest specifies the name of the Interest and one or multiple incoming faces that requested that Interest.

When an Interest packet arrives on a certain face, a longest-match lookup is done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. If so, the Interest's arrival face will be added to the PIT entry's requesting face list and the Interest will be discarded. Otherwise, the FIB will be checked and the Interest is forwarded along the one of more faces listed in the matching FIB entry.

Dynamic Namespace Configuration

As described previously, in CCN, packets (which include Interests and Content Objects) flow through the network based on their name prefix. When a device was initialized (either for the first time ever or when it joins a network), the device needs to notify other devices in the network of its existence and to notify network routers the physical addresses of its faces. For example, when a sensor (such as a thermometer) is installed in a home for the first time, the sensor needs to be configured in order to know where to send its data. Similarly, when a laptop or a tablet computer is moved from a home environment to a coffee shop, the computer needs to know to where to send its Interest and to optionally let other devices on the network know how to reach it. Although it is possible to manually configure the devices during initialization, existing CCN protocols lack solutions for automated device initialization.

In the existing Internet Protocol (IP) network, Dynamic Host Configuration Protocol (DHCP) is used for dynamically distributing network configuration parameters, such as IP addresses for interfaces and services. More specifically, DHCP allows computers to request IP addresses and networking parameters automatically from a DHCP server, reducing the need for a network administrator or a user from having the configuring these settings manually. A similar mechanism is needed in CCN to initialize a device when the device comes online for the first time or when it is introduced to a new environment. More specifically, in order for a device to function properly in a CCN network, the device needs to know where to send Interest packets for receiving certain services. Because CCN relies on name prefix to move packets, the initial configuration of a device will involve configurations of namespaces. For example, the device may need to set up default forwarding information (which can include one or more appropriate entries) in its FIB, or to configure namespaces of various services such that requests (in the form of Interests) to these services are appropriately forwarded. In addition, in order to obtain the services, the device needs to know the name or the name prefix to be included in the appropriate Interest messages. Examples of the services may include, but are not limited to: device registration, service discovery, certification services for authorizing keys, etc.

In order to provide a automated solution for device initialization, in some embodiments, the system implements a dynamic namespace configuration protocol (DNCP) to automatically configure a device with namespaces that are required for proper functioning of the device, such as default forwarding entries, namespace of device registration and discovery service, and namespace of a name resolution (indirection) service, etc. Note that in order for the DNCP to work, the following conditions need to be met. First, each device needs to run a basic CCN stack and is capable of generating and processing CCN Interests and Content Objects. Second, the devices are either manually configured or are automatically capable of establishing underlying network connectivity (which can include, but are not limited to: Ethernet, WiFi, Bluetooth, etc.). Third, each device needs to be provided with a manufacturer-supplied, unique device identifier, which is analogous to the media access control (MAC) address. Note that such a device ID can be 16 or 32 bytes long, or can have an arbitrary length. In addition, it can take any forms that are defined by the device manufacturer. For example, each temperature sensor made by a particular manufacture may have a unique ID issued by the manufacturer. In addition, each device needs to be pre-loaded with a signing key, such as a public-private key pair, a symmetric key, or any other signing key that confirms with CCN requirements, in order to sign Content Objects that it would like to publish. If a device is not pre-configured with such keys, the DNCP service needs to direct the device to an appropriate service to obtain or certify its keys by specifying the name of this service.

Figure 2:
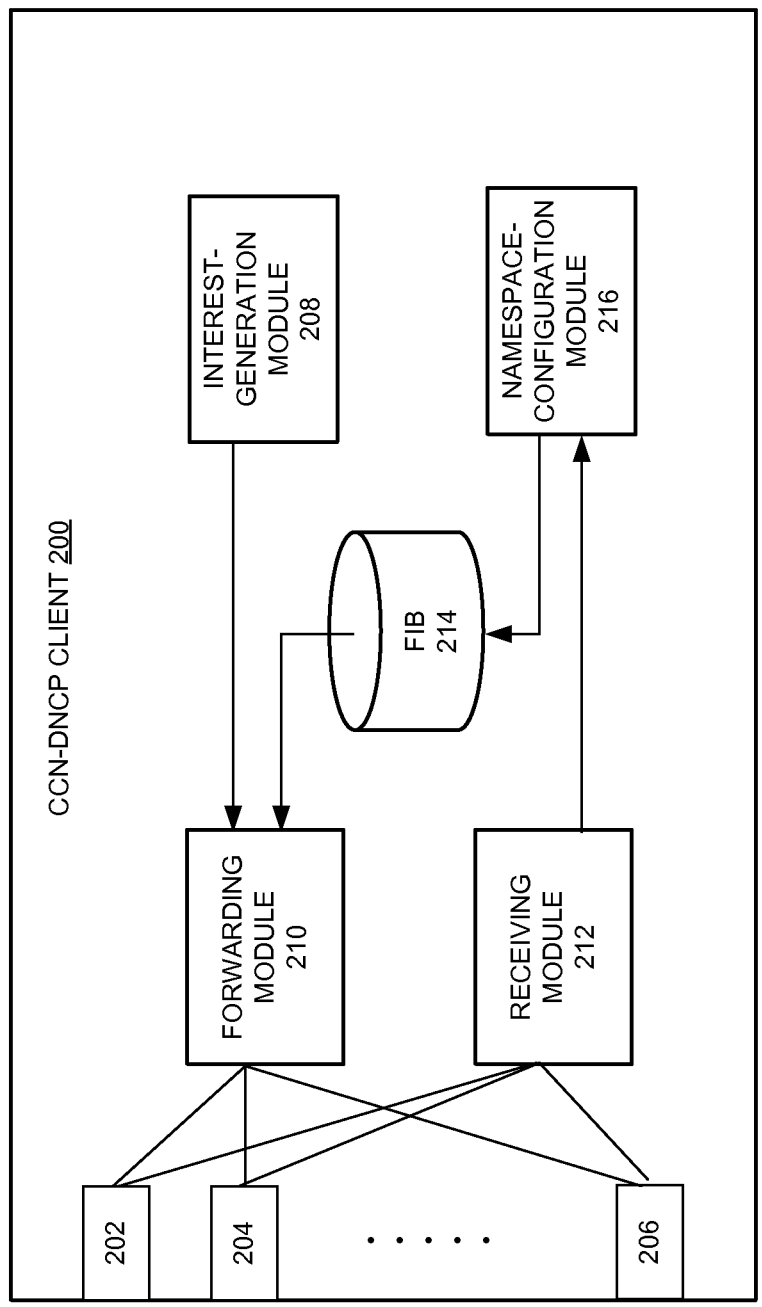
FIG. 2 presents a diagram presenting an exemplary architecture of a CCN dynamic namespace configuration protocol (DNCP) client, in accordance with an embodiment of the present invention.

FIG. 2 presents a diagram presenting an exemplary architecture of a CCN dynamic namespace configuration protocol (DNCP) client, in accordance with an embodiment of the present invention. In FIG. 2, CCN-DNCP client 200 includes a plurality of faces, such as faces 202, 204, and 206; an Interest-generation module 208; a forwarding module 210; a receiving module 212; a forwarding information base (FIB) 214; and a namespace configuration module 216.

Faces 202-206 can include not only physical interfaces but also application processes capable of sending and receiving packets. Interest-generation module 208 is responsible for generating Interest packets, which can be requests to content or services. In some embodiments, Interest-generation module 208 is configured to generate a "HELLO" Interest message, which can be used for requesting DNCP services. In further embodiments, the "HELLO" Interest message is generated in a pre-determined namespace. In other words, the system may predefine and reserve a namespace (such as "/hello") for DNCP purpose, and CCN-DNCP client 200 is preconfigured (by the CCN stack running on the machine) with such a namespace. Note that if the pre-defined DNCP namespace is "/hello," the "HELLO" Interest has a name prefix as "/hello."

Forwarding module 210 is responsible for forwarding packets, such as Interests or Content Objects, to the various faces on CCN-DNCP client 200. According to CCN protocol, forwarding module 210 forwards Interests based on entries in FIB 214, and forwards Content Objects based on entries in the PIT (not shown in FIG. 2). In some embodiments, forwarding module 210 is configured to forward (or broadcast) the "HELLO" Interest to all faces on CCN-DNCP client 200. FIB 214 stores information for forwarding Interests. Entries in FIB 214 are often indexed by the name prefixes. In some embodiments, FIB 214 can be pre-populated (during the initialization process) with default entries, and forwarding module 210 can use those default entries to forward Interests.

Receiving module 212 is responsible for receiving, from the various faces, packets, which can include Interests and Content Objects. For example, receiving module 212 may receive a Content Object in response to a previously sent Interest. In some embodiments, receiving module 212 can receive responses to the "HELLO" Interest from a remote DNCP server. The DNCP response can include, but are not limited to: default entries for FIB 214, and namespaces for various services, such as device registration and discovery, service discovery, a resolution service for obtaining signing keys or hashes for content names, key services, printing services, and any other network services that are either in use today or may be discovered in the future.

A default entry for FIB 214 can specify the physical address of a default forwarder, which can be the DMZ (demilitarized zone) router and may have a MAC address 00:01:02:03:04:05. Hence, any Interest in the root namespace "/" can be forwarded to the default forwarder. Another default entry may specify the physical address of a local router and its matching namespace. For example, the additional default entry may map a name prefix "/abc" to a MAC address 12:34:56:78:9A:9B, meaning that all Interests in the "/abc" namespace should be forwarded to a face with MAC address 12:34:56:78:9A:9B.

Namespace configuration module 216 is responsible for configuring the namespaces on CCN-DNCP client 200 based on the DNCP response. Once the namespaces are configured correctly, Interest-generation module 208 is then able to generate various service requests (which are in forms of Interests) accordingly, and forwarding module 210 is able to forward those service requests to appropriate destinations. For example, if the DNCP response specifies that the namespace for device-discovery services provided in room 2015 is "/devices/room2015," then Interest-generation module 208 can generate an Interest with a name prefix "/devices/room2015," and forwarding module 210 can forward such an Interest based on the name prefix. In addition, the system may use substructure schemes to refine the device-discovery space based on the device types. For example, the namespace "/devices/room2015/thermometers" may be used to discover all thermometers in room 2015. Other additional namespaces can also be included in the DNCP response, thus allowing namespace configuration module 216 to configure those namespaces accordingly. For example, a network may include a printer, and the DNCP response to a new client device may state that the namespace for the printer service is "/abc/printer." When the new device attempts to print out a document, it can send its printing request to namespace "/abc/printer." Note that the forwarding information associated with the namespaces is stored in FIB 214.

Figure 3:
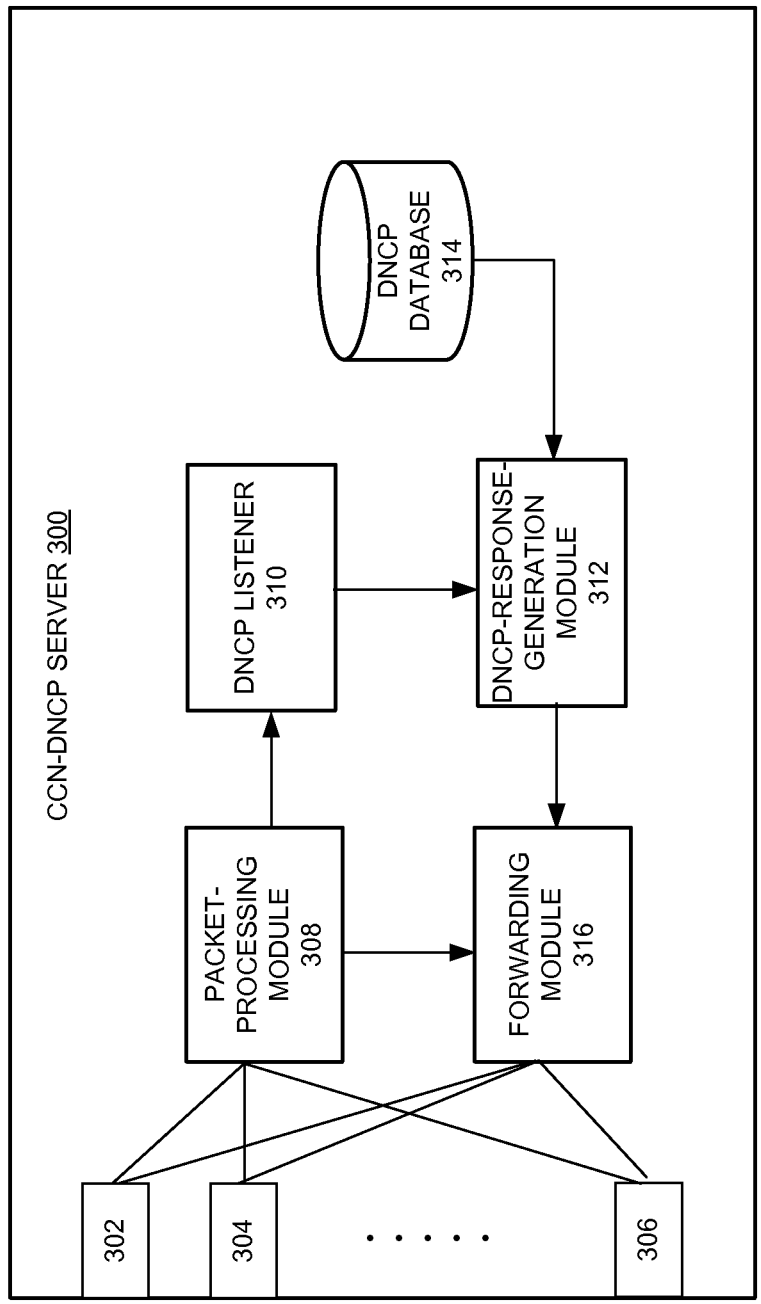
FIG. 3 presents a diagram presenting an exemplary architecture of a CCN-DNCP server, in accordance with an embodiment of the present invention.

FIG. 3 presents a diagram presenting an exemplary architecture of a CCN-DNCP server, in accordance with an embodiment of the present invention. In FIG. 3, CCN-DNCP server 300 includes a number of faces, such as faces 302, 304, and 306; a packet-processing module 308; a DNCP listener 310; a DNCP-response-generation module 312; a DNCP database 314; and a forwarding module 316.

Faces 302-306 are similar to faces 202-206, and can include both physical interfaces and application processes. Packet-processing module 308 is responsible for processing packets received on the various faces. In some embodiments, packet-processing module 308 extracts name prefix of the received packets. In further embodiments, if the name prefix of a received Interest is in the predetermined DNCP namespace (for example, the "/hello" namespace), packet-processing module 308 forwards the Interest to DNCP listener 310, which listens for Interest in the predetermined namespace. In the aforementioned example, the predetermined DNCP namespace is "/hello." When DNCP listener 310 receives a "HELLO" Interest message in the predetermined DNCP namespace, CCN-DNCP server 300 can determine that the node that sends the "HELLO" Interest is requesting DNCP service. In response to the DNCP request, DNCP-response-generation module 312 generates the appropriate DNCP response, in the form of a Content Packet, based on information stored in DNCP database 314. DNCP database 314 stores default FIB entries and various namespace configuration information, such as the namespace for device registration and discovery, the namespace for network service discovery, the namespace of a resolution service, the namespace of key services, etc. The namespace for device registration and discovery allows a client device to send registration or device-discovery Interest messages to a server. The service discovery namespace allows a client device to send Interest message in order to discover available network services. The namespace of a resolution service allows a client device to send Interest to the namespace in order to obtain publisher keys or hashes of content names. The namespace of the key services allows a client device to send Interest in order to obtain certified signing keys if the client device is not pre-loaded with certified keys. Note that because the network environment may change with time, the DNCP response packet may optionally include a lease time for each namespace, stating how long the namespace will remain valid. In such scenarios, the client device may need to periodically send DNCP Interest to ensure that their namespace configurations are still valid, and to update their namespace configurations when needed. Note that, because the client device has received previous DNCP response, it does not need to broadcast the DNCP Interest again, and can directly send the DNCP Interest to the DNCP service.

The generated DNCP response packet (as a Content Object) is forwarded back to the incoming face of the "HELLO" Interest by forwarding module 316 to ensure that the response packet is reverse-forwarded back to the originating node of the "HELLO" Interest.

There exists a situation where configuration information stored in DNCP database is too much for a single Content Object, or the configuration information may include multiple sectors some of which are essential for device operation and some of which may be optional. For example, the default FIB entries are essential configuration information, whereas the printer service may be optional. In some embodiments, DNCP-response-generation module 312 may generate a DNCP Content Object that includes instructions for the client device to obtain additional configuration information. For example, when a client device sends a first "HELLO" Interest that is forwarded to CCN-DNCP server 300, DNCP-response-generation module 312 may generate a DNCP Content Object that includes the essential configuration information (such as default FIB entries and the namespace for device registration). The DNCP Content Object may also indicate more DNCP information available, and specify the namespace associated with the additional DNCP information. Hence, to obtain the additional information, the client device can send additional DNCP request to the specified namespace. For example, the initial DNCP response to a client device may indicate that printing service is available, and to obtain namespace for the printing service, the client device needs to send a new "HELLO" Interest to the "/hello-1" namespace. Similarly, if the available DNCP information occupies multiple Content Objects, the first Content Object sent to the client device may indicate that the client device needs to send a new "HELLO" Interest to the "/hello-1" namespace to retrieve a subsequent Content Object.

Figure 4:
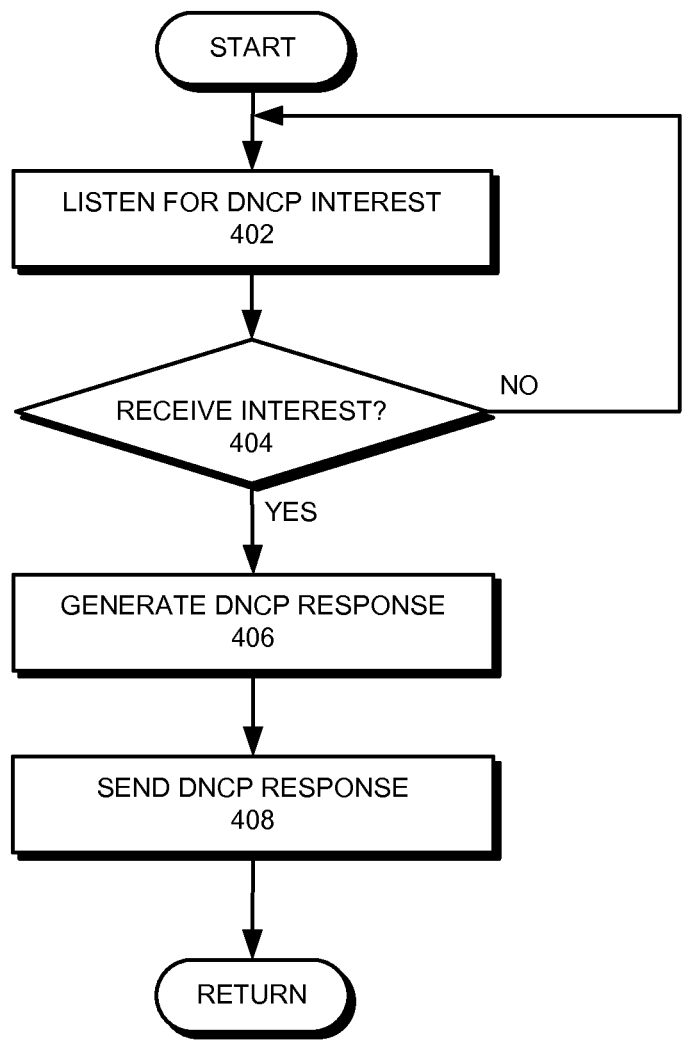
FIG. 4 presents a flowchart illustrating an exemplary server process for dynamic namespace configuration, in accordance with an embodiment of the present invention.

FIG. 4 presents a flowchart illustrating an exemplary server process for dynamic namespace configuration, in accordance with an embodiment of the present invention. During operation, the system listens for Interest in a predetermined namespace (operation 402), and determines whether a predetermined Interest with a name prefix in such a namespace is received from a client device (operation 404). For example, the predetermined namespace can be a DNCP namespace, such as "/hello," and the predetermined DNCP Interest can be a predefined "HELLO" packet. In some embodiments, the DNCP namespace and the format of the "HELLO" Interest are preconfigured by the CCN protocol running on the server and the client devices.

If the system receives a DNCP Interest, the system generates a DNCP response (operation 406), and sends the DNCP response back to the originating node of the DNCP Interest (operation 408). The DNCP response can include default FIB entries (such as a default face to which the client device can send its Interest) as well as namespaces for various services. In some embodiments, the DNCP Interest indicates the types of services requested by the client, and the DNCP response is generated based in the requested services. For example, the DNCP Interest may indicate that the originating node does not have a signing key. In response, the DNCP response includes the namespace of the key service, to which the client can send an Interest to obtain the signing key.

Figure 5:
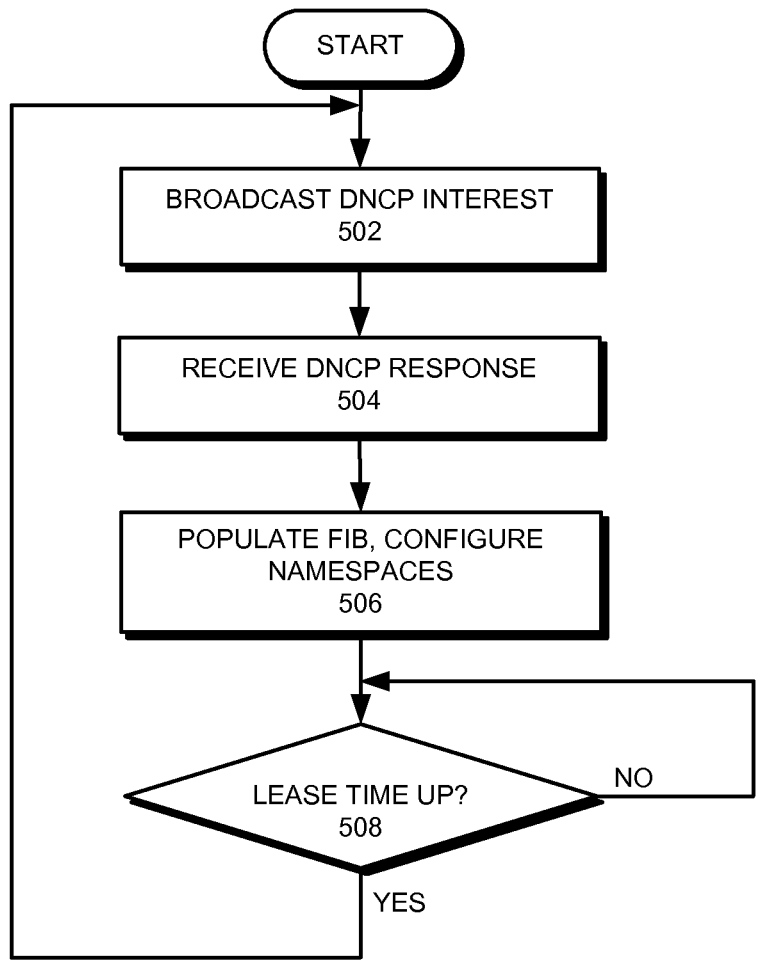
FIG. 5 presents a flowchart illustrating an exemplary client process for dynamic namespace configuration, in accordance with an embodiment of the present invention.

FIG. 5 presents a flowchart illustrating an exemplary client process for dynamic namespace configuration, in accordance with an embodiment of the present invention. During operation, a client device that joins a new environment or is brought-up online for the first time broadcast a DNCP request message on all of its faces (operation 502). In some embodiments, the DNCP request message is an Interest packet with a name prefix within a predefined namespace. The predefined namespace can be a namespace reserved specially for the DNCP service. For example, the system may reserve a namespace "/hello" for the DNCP service. The DNCP Interest or the "HELLO" Interest then has a name prefix "/hello." Note that because the DNCP Interest (or "HELLO" Interest) is broadcast on all faces of the client device, a DNCP service may either directly receives the "HELLO" Interest on one of its faces, or receives the "HELLO" Interest forwarded by other devices. In some embodiments, there exists other devices (such as other client devices) in the network environment that perform the task of a bridge or have the forwarding information set up in a way such that these devices can receive and forward the "HELLO" Interest to the DNCP service in a CCN network.

The client device then receives a DNCP response packet from the DNCP service (operation 504). The DNCP response packet is in the form of a Content Object. In some embodiments, the name of the DNCP Content Object matches the name of the Interest message, such as "/hello." The DNCP Content Object includes information that can be used to configure the client device, such as default FIB entries and various namespaces that can be used by the client device to obtain necessary services. Upon receiving the DNCP response, the client device populates its FIB with the default entries and configures its namespaces (operation 506). Note that once the FIB is populated with the default entries and the namespaces are configured, the client device would be able to generate Interest with the appropriate name prefix in order to obtain services.

In some embodiments, the namespace included in the DNCP response may have a lease time (such as a day or 10 days), meaning that they are valid only for a certain predetermined time period. In such scenarios, the client device may determine whether the lease time is up (operation 508), and resend the DNCP Interest to obtain up to date configuration setting (operation 502).

Note that in the examples shown in FIGS. 2-5, the DNCP request is answered by a DNCP server or a server process. In practice, it also possible to have the DNCP-response process running on a cluster of computers. Moreover, it is also possible to have other peer client computers in the CCN network to respond to the DNCP Interest. In some embodiments, a peer client machine can respond to a DNCP Interest with a Content Object that includes re-direction information. For example, the Content Object may provide an alternative DNCP namespace (which is different from the namespace of the DNCP Interest) to which the requesting client can send DNCP requests. This re-direction Content Object may also include configuration information of other client devices in the CCN network. For example, a client device joining a CCN network sends a DNCP Interest to the "/hello" namespace, and receives a Content Object from an existing peer client device in the CCN network. The Content Object indicates that the new client device needs to send a new DNCP Interest to a namespace "/name-abc" to obtain configuration information. In addition, the Content Object may also state that other peer devices on the network use the "/device-discovery" namespace for registration of new devices and for discovery of other new devices on the network.

Service Registration and Discovery

Once a device is initially configured, it can either obtain services from or provide services to other devices on the same CCN. Like any other types of network, CCN networks enable various network services, such as computation service, storage service, communication service, and sensors or actuator functions. These network services are provided dynamically by different types of devices coupled to the network. For example, a computer may lend its processor time and storage to other devices coupled to the network; similarly, it can access a printer coupled to the network to print documents. In order for a client device to discover and reach the various network services, these services first need to register themselves to the network. In some embodiments, a service-discovery broker handles the registration and deregistration of network services, and provides metadata associated with registered services to requesting client devices to enable the client devices to obtain the services.

Figure 6:
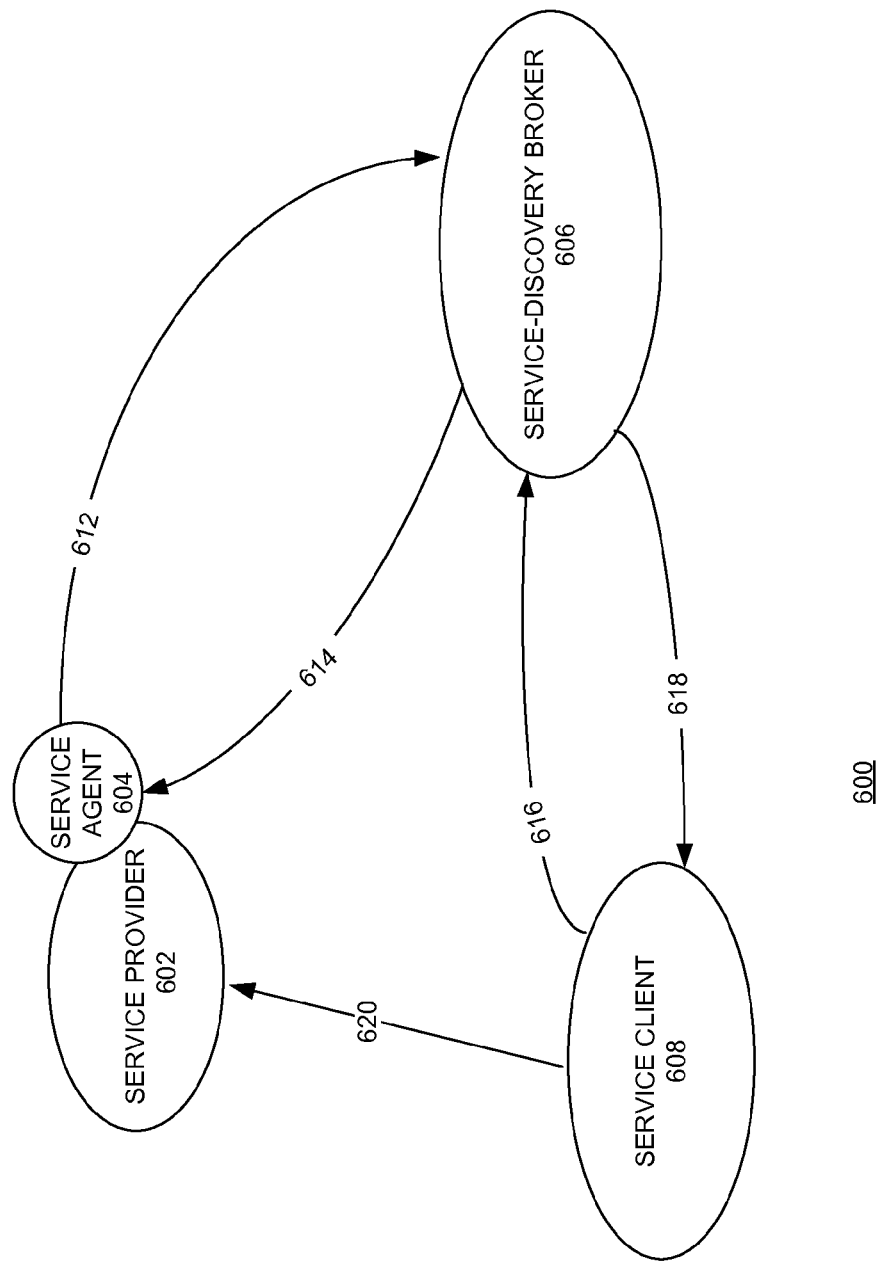
FIG. 6 provides a diagram illustrating an exemplary content-centric network for discovery of network services, in accordance with an embodiment of the present invention.

FIG. 6 provides a diagram illustrating an exemplary content-centric for discovery of network services, in accordance with an embodiment of the present invention. In FIG. 6, a CCN network 600 includes a service provider 602, a service agent 604, a service-discovery broker 606, and a service client 608.

Service provider 602 is a device capable of providing one or more services, which can include but are not limited to: computation, storage, printing, communication, sensory, actuator, etc., to other devices on the network. Service agent 604 is a component that represents service provider 602 on CCN network 600. Service agent 604 can be a software module or can be implemented in hardware. In some embodiments, service agent 604 is located within the same physical enclosure as service provider 602. It is also possible for service agent 604 to be located remotely and to couple to service provider 602 via a network. Service agent 604 interacts with service-discovery broker 606 and service client 608 on behalf of service provider 602. In some embodiments, service agent 604 runs a CCN protocol stack and is able to generate CCN Interests and receive Content Objects.

Service-discovery broker 606 is responsible for managing the service-discovery namespace. During operation, service-discovery broker 606 admits (registers) and demits (deregisters) services, and responds to queries from service client 608 for admitted services. Service client 608 is a consumer of a service offered on CCN network 600.

Before service provider 602 can provide services to the network, it needs to register itself with service-discovery broker 606. To do so, service agent 604 sends an Interest (as shown by an arrow 612) in a predetermined service-discovery namespace to service-discovery broker 606. The Interest includes information required for registration of service provider 602. The required service-registration information can include one or more of: a public key (or a reference thereto) of service agent 604, an optional proposed CCN name for the service, a description of the service, and additional required metadata. Note that the description of the service provides useful information for potential service clients, and the metadata enables the service clients to interact with service agent 604.

Service-discovery broker 606 processes the Interest, and if it determines that all required information is provided, service-discovery broker 606 responds to the Interest with an admission-confirmed Content Object, and sends the Content Object back to service agent 604 (as shown by an arrow 614). In some embodiments, the Content Object includes an admission token encrypted with the public key of service agent 604, and an approved name of the service, which can be the same as or different from the proposed name included in the Interest. In addition, service-discovery broker 606 updates a service database with the received service-registration information. Once service agent 604 receives the admission-confirmed Content Object, it can initiate the service and interact with service clients. In some embodiments, during service initiation, service agent 604 extracts the approved name of the service from the admission-confirmed Content Object, and announces to CCN network 600 that Interests for that name (which is in an appropriate namespace and is routable in CCN network 600) are to be forwarded to service agent 604.

When service client 608 attempts to find a service, it sends an Interest (as shown by an arrow 616) in the predetermined service-discovery namespace to service-discovery broker 606. Service-discovery broker 606 responds to such an Interest (as shown by an arrow 618) with a Content Object, which includes a list of admitted services and their metadata. Upon receiving the Content Object, service client 608 can then send a service-request Interest (as shown by an arrow 620) to the request for service.

From FIG. 6, one can see that service-discovery broker 606 is an essential player in the entire service-discovery process. In certain situations, a failure of service-discovery broker 606 may interrupt service discoveries in the network, meaning that service client 608 may not be able to find the service needed. However, the inherent content caching of the CCN network may mitigate this problem to a certain degree, because a Content Object with the list of admitted services may be cached at one or more nodes in the network (such as by a service client). Such a Content Object may be routed to a requesting client, even when service-discovery broker 606 fails to operate.

Note that the predetermined service-discovery namespace plays an important role in the process of the service discovery because all Interests and Content Objects related to the service discovery are within this service-discovery namespace. The root CCN name of the service-discovery namespace needs to be established a priori by convention and is well known across the participants of the service-discovery process. For example, in one convention, the service-discovery namespace within an organization "abc" can be "/abc/services." This namespace can be distributed to devices in the network (or in the "/abc" namespace) during their initial configuration when they join the network. Moreover, child namespaces may also be set up during the initial configuration of a device. For example, when a printer joins the network, the DNCP service may set up the printer service namespace as "/abc/services/printer."

The service-discovery namespace can include a hierarchy of names structuring one or more kinds of services in various ways. For example, the service-discovery namespace can be organized by service type, such as printer, projector, storage, etc. Alternatively, the service-discovery namespace can be organized by location, such as buildings, floors, rooms, etc. Any other variations that are suitable for the environment that they serve are also possible, such as a combination of location and service type.

In some embodiments, CCN names that are children of a service-discovery namespace are services within that namespace. A child name has a possibility of being yet another service-discovery namespace. For example, a CCN name "/abc/services/printers" can also be a discoverable namespace with multiple children, such as "/abc/services/printers/printer-1," "abc/services/printers/printer-2," etc. In some embodiments, each service provider in the network is given a unique name (and, hence, a child namespace) within the service-discovery namespace. Service-discovery Interests and Content Objects related to a particular service provider are all in the child namespace corresponding to the particular service provider.

Figure 7:
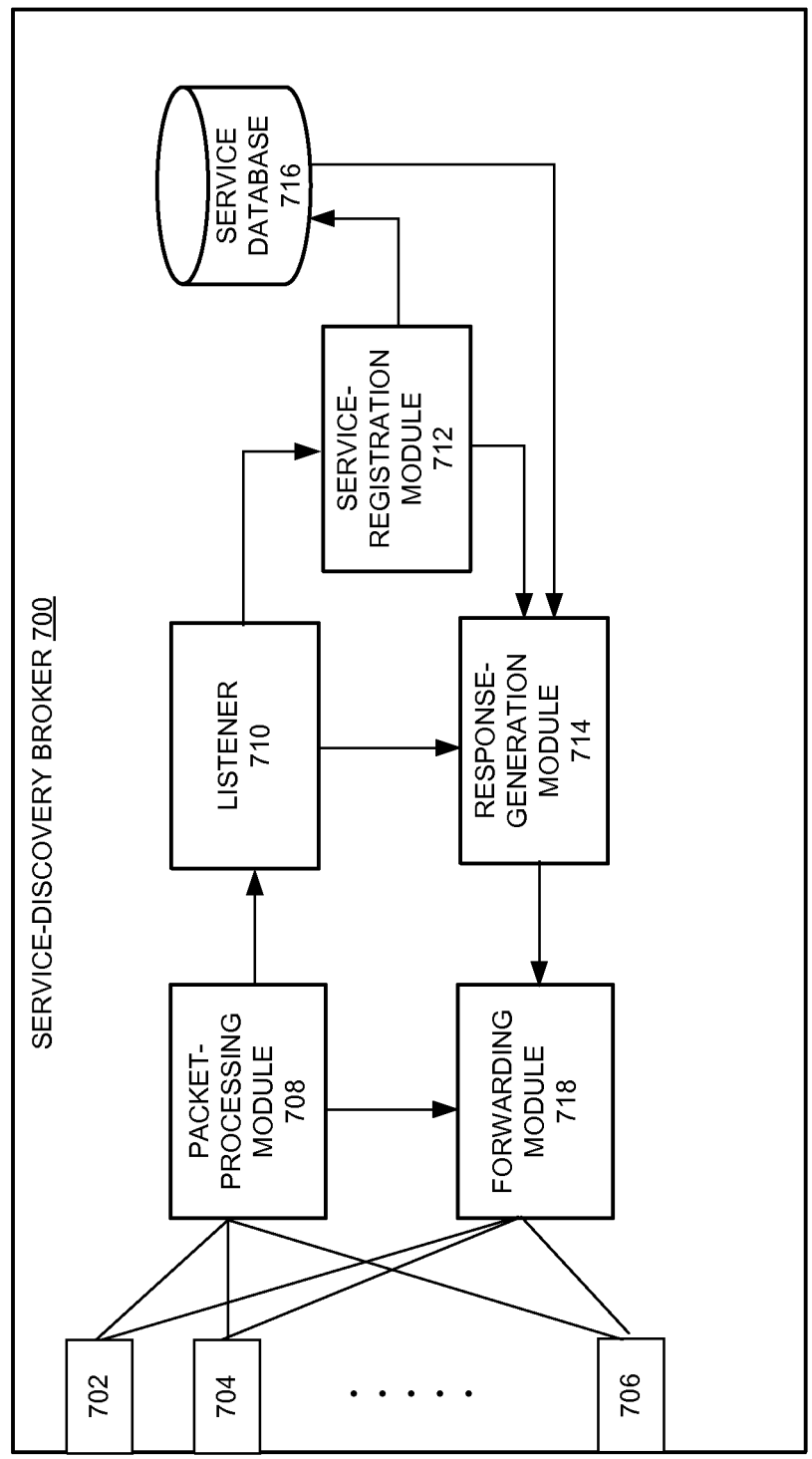
FIG. 7 presents a diagram illustrating an exemplary architecture of a service-discovery broker, in accordance with an embodiment of the present invention.

FIG. 7 presents a diagram illustrating the architecture of an exemplary service-discovery broker, in accordance with an embodiment of the present invention. Service-discovery broker 700 includes a number of faces, such as faces 702, 704, and 706; a packet-processing module 708; a listener 710; a service-registration module 712; a response-generation module 714; a service database 716, and a forwarding module 718.

Faces 702-706 are similar to faces 202-206, and can include both physical interfaces and application processes. Packet-processing module 708 is responsible for processing packets received on the various faces. In some embodiments, to facilitate service registration, packet-processing module 708 processes the received Interest and sends it to listener 710, which listens for Interest messages in various service-discovery namespaces. Note that within a service-discovery namespace, a particular sub-namespace may be reserved for services to join the service-discovery namespace. For example, if a printer wants to join the "/abc/services/printers" service-discovery namespace, it may send a service-registration Interest to "/abc/services/printers/nonce." The service-registration Interest can include one or more of: the public key of the service agent of the printer, the proposed printer name (such as "parakeet"), a description of the printer (may include make and model), and any required metadata.

Once listener 710 receives the service-registration Interest, service-registration module 712 can determine whether all information needed for admission is provided in the Interest; if so, service-registration module 712 registers the service by updating service database 716 using information included in the service-registration Interest. Note that if there is a conflict in the proposed service name (for example, the proposed name has been used by a different service or it violates a naming rule), service-registration module 712 may assign a new name to the service. In addition, service-registration module 712 may instruct response-generation module 714 to generate a registration-confirmed Content Object, which can include an admission token encrypted with the public key of the service agent of the printer, and the approved name (which can be "parakeet") of the printer.

If not all necessary admission information is provided, service-registration module 712 instructs response-generation module 714 to generate a registration-failed Content Object, indicating the registration failure and additional information needed for successful registration. The generated Content Object (registration confirmed or registration failed) is then returned to the service agent of the printer by forwarding module 718.

Listener 710 also listens for service-discovery Interest messages directed to the top of the tree of names that comprises its service-discovery namespace, such as "/abc/services," or its children "/abc/services/printers" and "/abc/services/Fortunes. Note that all these namespaces represent discoverable services. Once listener 710 receives such a service-discovery Interest, response-generation module 714 checks service database 716 and generates a service-response Content Object using information obtained from service database 716. In some embodiments, the service-response Content Object includes a list of names of the next-level child namespaces and information necessary for new services to register themselves with service-discovery broker 700. For example, if the service-discovery Interest is directed to "/abc/services," the service-response Content Object may include in its payload a list of the names of the child namespaces, in this example, "/abc/services/printers" and "/abc/services/Fortunes." If the service-discovery Interest is directed to "/abc/services/printers," the service-response Content Object may include in its payload a list of printers, together with descriptions and metadata (such as make and model, etc.) associated with each printer, such as "/abc/printer/parakeet, Xerox WorkCenter 7345, 2.113.0," and "/abc/printer/speedy, Xerox DocuPrint 4180." In some embodiments, the list may be a filtered list, and the filter parameters may be included in the service-discovery Interest. Upon receiving the service-response Content Object, the service client can determine which of these printers is suitable to use and uses the name of the printer to negotiate the printing service.

In addition to the registration and discovery Interests, listener 710 also listens for service-deregistration (demitting) Interest. When a service is no longer participating, such as when the service provider is being taken offline, the service agent of the service provider will send a deregistration Interest to service-discovery broker 700, indicating that the service is to be removed. For authentication purposes, the Interest includes a previously obtained admission-token encrypted using the service agent's private key, and then the public key of service-discovery broker 700. Once listener 710 receives such a deregistration Interest, service-registration module 712 deregisters the service by removing the service name from service database 716. In addition, the service agent of the service provider removes the previously established (during the service initiation process) announcement to the network that Interests for the name are to be forwarded to the service agent.

Figure 8:
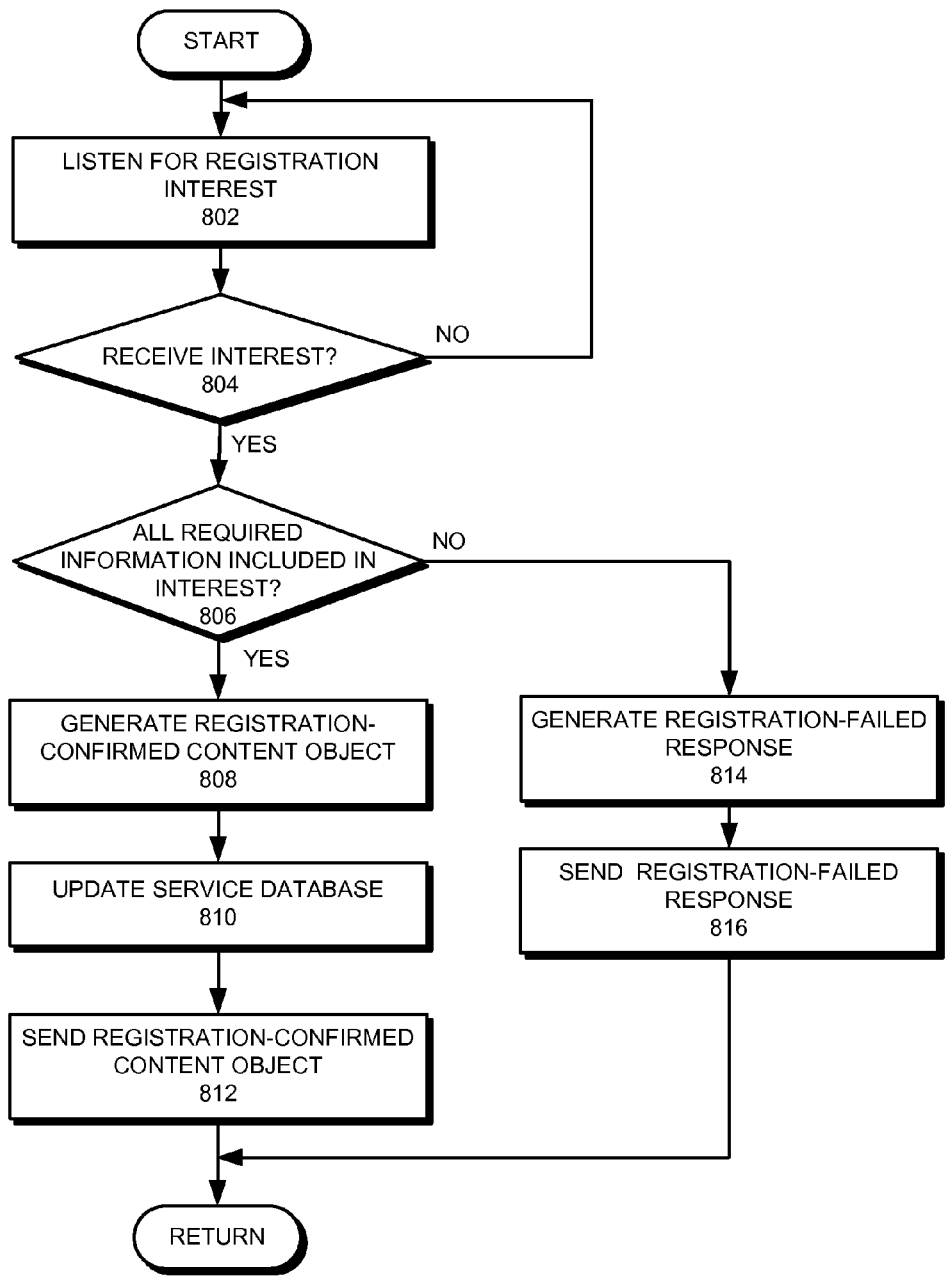
FIG. 8 presents a flowchart illustrating an exemplary service-registration process, in accordance with an embodiment of the present invention.

FIG. 8 presents a flowchart illustrating an exemplary service-registration process, in accordance with an embodiment of the present invention. During operation, the service-discovery broker listens for service-registration Interest (operation 802), and determines whether a service-registration Interest is received (operation 804). In some embodiments, the Interest is sent by a service agent of a service provider, and the Interest can include various information, such as the public key of the service agent, a proposed name for the service, a description of the service, and other required metadata. Note that the Interest is transmitted via the CCN network, to which the service provider and the service-discovery broker belong. If such an Interest is received, the service-discovery broker determines whether all information required for correctly registering the service is included in the registration Interest (operation 806). If so, the service-discovery broker generates a registration-confirmed Content Object, which includes an admission token and the approved name for the service (operation 808). The service-discovery broker then updates its service database (operation 810), and sends back the registration-confirmed Content Object to the corresponding service agent (operation 812). If not all required information is provided by the registration Interest, the service-discovery broker generates a registration-failed Content Object (operation 814), and sends that Content Object back to the service agent to request the additional information (operation 816).

Figure 9:
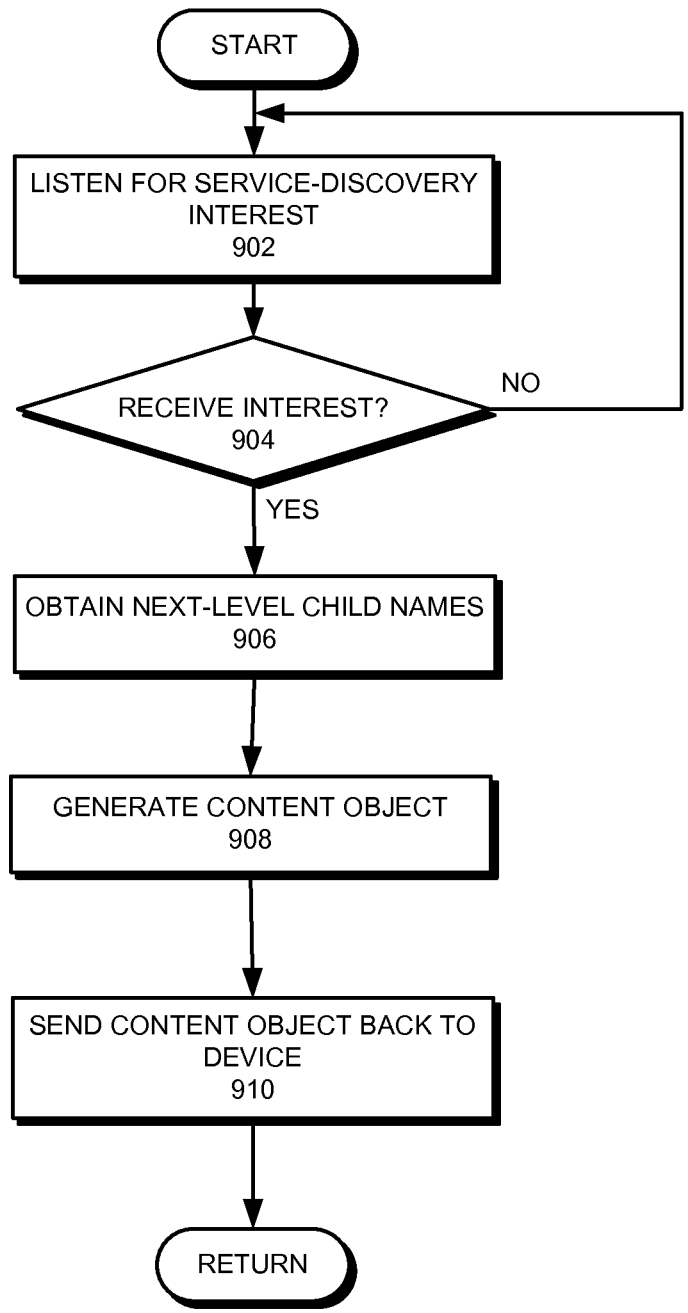
FIG. 9 presents a flowchart illustrating an exemplary service-discovery process, in accordance with an embodiment of the present invention.

FIG. 9 presents a flowchart illustrating an exemplary service-discovery process, in accordance with an embodiment of the present invention. During operation, the service-discovery broker listens for Interest on the various levels of service-discovery namespaces (operation 902), and determines whether an Interest is received (operation 904). If so, the service-discovery broker obtains a list of next-level child names from the service database (operation 906), generates a Content Object that includes a list of services and their metadata (operation 908), and sends back the Content Object to the requesting device (operation 910).

Note that, although as shown in FIG. 6 the service-discovery broker can be a process running on a stand-alone, centralized server that handles service discovery, in practice, it can be a process running on any type or number of machines. For example, it can run on a cluster of machines as a distributed service. In addition, instead of being located on a server, the service-discovery broker may be part of a client device. For example, it may be running as part of a service provider that is capable of providing the service-registration/discovery services to other service providers.

Computer and Communication System

Figure 10:
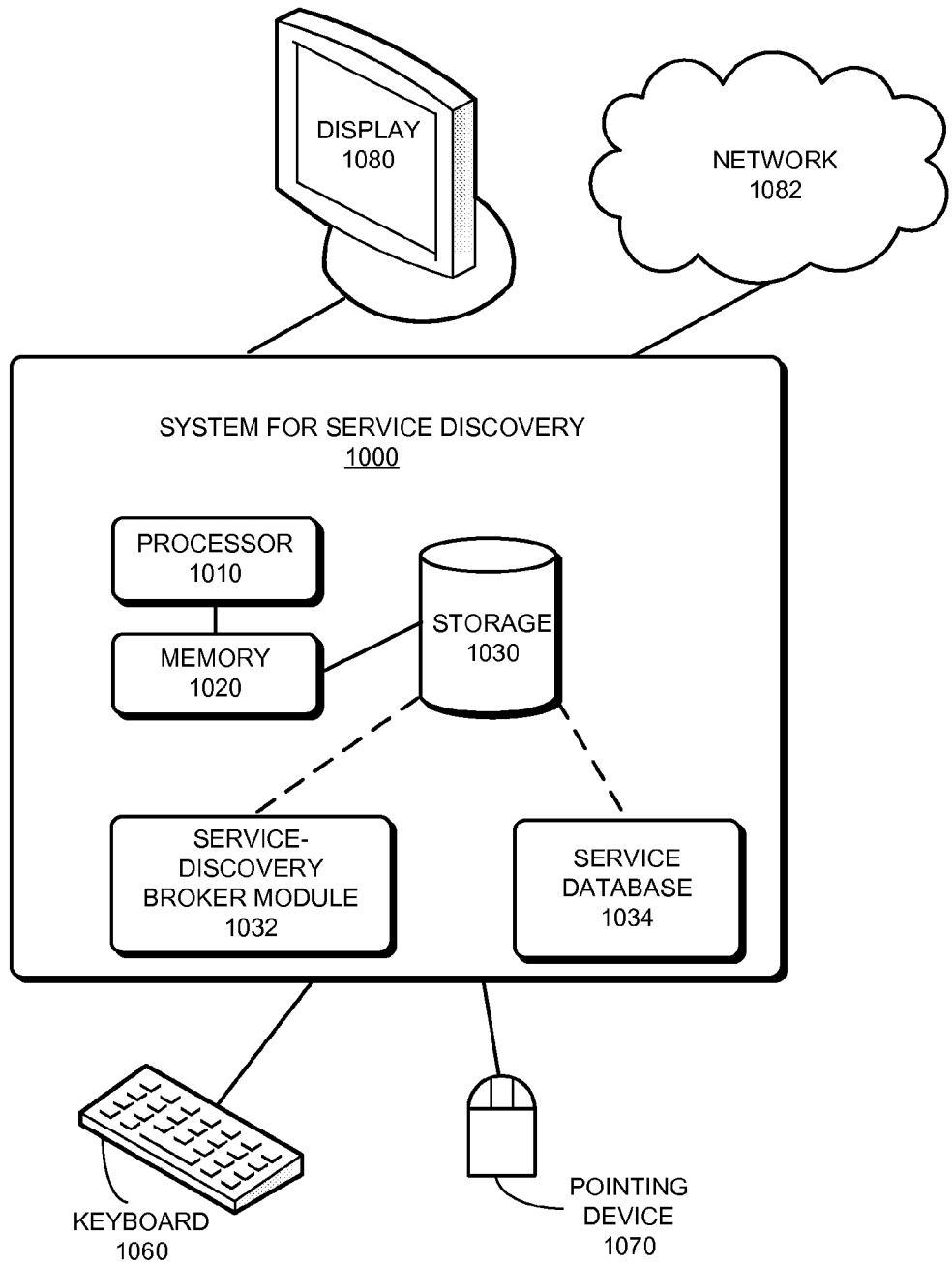
FIG. 10 illustrates an exemplary system for service discovery, in accordance with an embodiment.

FIG. 10 illustrates an exemplary system for service discovery, in accordance with an embodiment. A system 1000 for service discovery comprises a processor 1010, a memory 1020, and a storage 1030. Storage 1030 typically stores instructions that can be loaded into memory 1020 and executed by processor 1010 to perform the methods mentioned above. In one embodiment, the instructions in storage 1030 can implement a service-discovery broker module 1032 and a service database 1034, both of which can be in communication with each other through various means.

In some embodiments, modules 1032 and 1034 can be partially or entirely implemented in hardware and can be part of processor 1010. Further, in some embodiments, the system may not include a separate processor and memory. Instead, in addition to performing their specific tasks, modules 1032 and 1034, either separately or in concert, may be part of general- or special-purpose computation engines.

Storage 1030 stores programs to be executed by processor 1010. Specifically, storage 1030 stores a program that implements a system (application) for facilitating device registration and discovery. During operation, the application program can be loaded from storage 1030 into memory 1020 and executed by processor 1010. As a result, system 1000 can perform the functions described above. System 1000 can be coupled to an optional display 1080 (which can be a touch screen display), keyboard 1060, and pointing device 1070; system 1000 can also be coupled via one or more network interfaces to network 1082.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for service discovery in a content-centric network (CCN), the method comprising:
listening, by a computer over the content-centric network, for registration interests in a predetermined service-discovery namespace;
receiving a registration interest associated with a service from a service provider;
determining whether the registration interest meets a predetermined requirement for registering the service with a service-discovery broker;
generating a confirmation content object in response to receiving the registration interest that meets the registration requirement, wherein the confirmation content object includes at least a name assigned to the service by the service-discovery broker and an admission token; and
returning the confirmation content object to the service provider, thereby enabling the service provider to provide the service to the CCN.

2. The method of claim 1, wherein the registration interest further includes a public key associated with the service provider, and wherein the admission token is encrypted using the public key.

3. The method of claim 1, wherein the registration interest further includes a description of the service and operational metadata associated with the service.

4. The method of claim 1, wherein the service-discovery namespace is hierarchically structured.

5. The method of claim 4, further comprising:
receiving, from a service client, a service-discovery interest in the service-discovery namespace;
generating a service-response content object, wherein the service-response content object includes names of one or more next-level child namespaces of the service-discovery namespace; and
returning the service-response content object to the service client, thereby enabling the service client to send a service request to the one or more next-level child namespaces.

6. The method of claim 1, further comprising receiving a deregistration interest from the service provider for the service, wherein the deregistration interest includes the admission token.

7. The method of claim 1, further comprising updating a service database by adding the service using the name assigned to the service.

8. A non-transitory computer-readable storage medium storing instructions that when executed by a computing device cause the computing device to perform a method for service discovery in a content-centric network (CCN), the method comprising:
listening, by a computer over the content-centric network, for registration interests in a predetermined service-discovery namespace;
receiving a registration interest associated with a service from a service provider;
determining whether the registration interest meets a predetermined requirement for registering the service with a service-discovery broker;
generating a confirmation content object in response to receiving the registration interest that meets the registration requirement, wherein the confirmation content object includes at least a name assigned to the service by the service-discovery broker and an admission token; and
returning the confirmation content object to the service provider, thereby enabling the service provider to provide the service to the CCN.

9. The computer-readable storage medium of claim 8, wherein the registration interest further includes a public key associated with the service provider, and wherein the admission token is encrypted using the public key.

10. The computer-readable storage medium of claim 8, wherein the registration interest further includes a description of the service and operational metadata associated with the service.

11. The computer-readable storage medium of claim 8, wherein the service-discovery name space is hierarchically structured.

12. The computer-readable storage medium of claim 11, wherein the method further comprises:
receiving, from a service client, a service-discovery interest in the service-discovery namespace;
generating a service-response content object, wherein the service-response content object includes names of one or more next-level child namespaces of the service-discovery namespace; and
returning the service-response content object to the service client, thereby enabling the service client to send a service request to the one or more next-level child namespaces.

13. The computer-readable storage medium of claim 8, wherein the method further comprises receiving a deregistration interest from the service provider for the service, wherein the deregistration interest includes the admission token.

14. The computer-readable storage medium of claim 8, wherein the method further comprises updating a service database by adding the service using the name assigned to the service.

15. A computer system for service discovery in a content-centric network (CCN), the system comprising:
a processor; and
a storage device coupled to the processor and storing instructions which when executed by the processor cause the processor to perform a method, the method comprising:
listening, by a computer over the content-centric network, for registration interests in a predetermined service-discovery namespace;
receiving a registration interest associated with a service from a service provider;
determining whether the registration interest meets a predetermined requirement for registering the service with a service-discovery broker;
generating a confirmation content object in response to receiving the registration interest that meets the registration requirement, wherein the confirmation content object includes at least a name assigned to the service by the service-discovery broker and an admission token; and
returning the confirmation content object to the service provider, thereby enabling the service provider to provide the service to the CCN.

16. The system of claim 15, wherein the registration interest further includes a public key associated with the service provider, and wherein the admission token is encrypted using the public key.

17. The system of claim 15, wherein the registration interest further includes a description of the service and operational metadata associated with the service.

18. The system of claim 15, wherein the service-discovery namespace is hierarchically structured.

19. The system of claim 18, wherein the method further comprises:
receiving, from a service client, a service-discovery interest in the service-discovery namespace;
generating a service-response content object, wherein the service-response content object includes names of one or more next-level child namespaces of the service-discovery namespace; and
returning the service-response content object to the service client, thereby enabling the service client to send a service request to the one or more next-level child namespaces.

20. The system of claim 15, wherein the method further comprises receiving a deregistration interest from the service provider for the service, wherein the deregistration interest includes the admission token.

21. The system of claim 15, wherein the method further comprises updating a service database by adding the service using the name assigned to the service.

* * * * *